United States Patent
Lin et al.

(10) Patent No.: US 8,623,490 B2
(45) Date of Patent: Jan. 7, 2014

(54) METHOD AND APPARATUS FOR TEMPERATURE-COMPENSATED ENERGY-ABSORBING PADDING

(75) Inventors: Chin-Hsu Lin, Troy, MI (US); Alan L. Browne, Grosse Pointe, MI (US); Nancy L. Johnson, Northville, MI (US); Jan H. Aase, Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 147 days.

(21) Appl. No.: 12/727,676

(22) Filed: Mar. 19, 2010

(65) Prior Publication Data

US 2011/0229685 A1    Sep. 22, 2011

(51) Int. Cl.
*B32B 3/12*    (2006.01)
*B32B 7/12*    (2006.01)

(52) U.S. Cl.
USPC .......... 428/117; 428/118; 428/317.1; 428/99; 428/100

(58) Field of Classification Search
USPC ......... 428/117, 217, 119, 317.1, 99, 100, 118
See application file for complete search history.

(56) References Cited

U.S. PATENT DOCUMENTS

| | | | |
|---|---|---|---|
| 4,638,510 A | 1/1987 | Hubbard | |
| 6,009,566 A | 1/2000 | Hubbard | |
| 6,010,584 A | 1/2000 | Fonda et al. | |
| 7,155,747 B2 | 1/2007 | Baker | |
| 7,264,271 B2 | 9/2007 | Barvosa-Carter et al. | |
| 7,267,367 B2 | 9/2007 | Barvosa-Carter et al. | |
| 7,392,876 B2 | 7/2008 | Browne et al. | |
| 7,498,926 B2 | 3/2009 | Browne et al. | |
| 2002/0142119 A1* | 10/2002 | Seward et al. | 428/36.9 |
| 2005/0267570 A1* | 12/2005 | Shadduck | 623/1.44 |
| 2006/0170243 A1 | 8/2006 | Browne et al. | |
| 2007/0080013 A1 | 4/2007 | Melz et al. | |
| 2008/0011753 A1* | 1/2008 | Browne et al. | 220/260 |
| 2008/0197674 A1 | 8/2008 | Browne et al. | |

OTHER PUBLICATIONS

Sofia et al., "Shape Morphing Hinged Truss Structures", Smart Mater. Struct. 18 (2000), 8 pages.*
FIA Standard 8858-2002, HANS System, 2002, Federation Internationale de L'Automobile, Jul. 28, 2005 Version 3.0.
Thomas, Tonnia, et al, Dynamic Compression of Cellular Cores: Temperature and Strain Rate Effects, Composite Structures 58(2002) 505-512; 2002; Elsevier Science Ltd.; www.elsevier.com.

* cited by examiner

*Primary Examiner* — Hai Vo

(57) ABSTRACT

Impact absorbing padding includes a unitary piece including a polymeric material commingled with a structural element. The polymeric material includes a material having a first temperature-responsive stiffness, and the structural element includes an element fabricated from a shape memory alloy formulated to have a second temperature-responsive stiffness that is converse to the first temperature-responsive stiffness.

16 Claims, 3 Drawing Sheets

METHOD AND APPARATUS FOR TEMPERATURE-COMPENSATED ENERGY-ABSORBING PADDING

TECHNICAL FIELD

This disclosure is related to energy-absorbing padding, and more specifically temperature-compensated energy-absorbing padding.

BACKGROUND

The statements in this section merely provide background information related to the present disclosure and may not constitute prior art.

Protection devices use padding to absorb impact energy and protect against injury to soft tissue, organs, and property. Protection devices including helmets, kneepads, elbow pads, and chest protectors contain padding to absorb impact energy. Designers of passenger compartments install impact-absorbing padding for occupant protection. Other protection devices include padding that is attached to walls and corners in corridors of buildings and padding associated with posts, utility poles, and equipment in recreational areas. Protection devices include padding material to protect devices from impact energy during shipment and/or in use. Padding material can undergo elastic and/or plastic deformation while absorbing compressive force and energy in response to an impact. Known padding used in protection devices is fabricated using homologous materials having a capacity for impact-absorption that varies with material temperature, which changes in response to changes in ambient temperature.

SUMMARY

Impact absorbing padding includes a unitary piece including a polymeric material commingled with a structural element. The polymeric material includes a material having a first temperature-responsive stiffness, and the structural element includes an element fabricated from a shape memory alloy formulated to have a second temperature-responsive stiffness that is converse to the first temperature-responsive stiffness.

BRIEF DESCRIPTION OF THE DRAWINGS

One or more embodiments will now be described, by way of example, with reference to the accompanying drawings, in which.

DETAILED DESCRIPTION

Figure 1A:
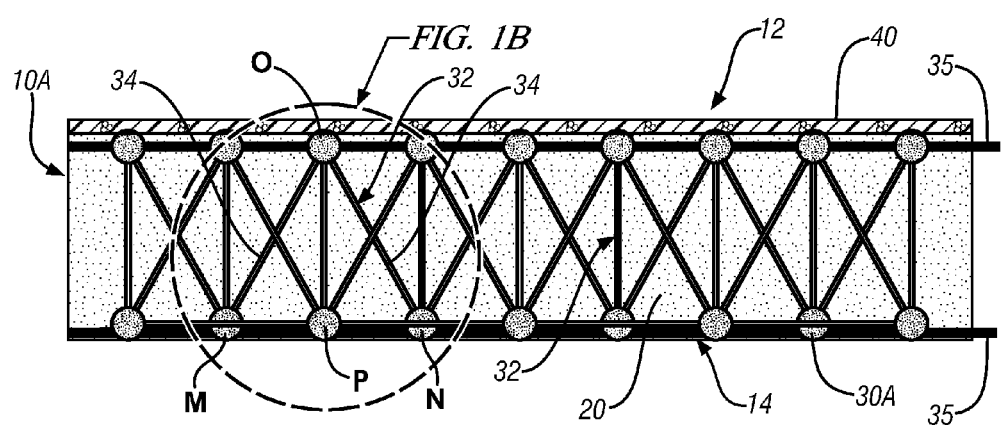
FIGS. 1A and 1B are schematic diagrams of a first embodiment in accordance with the present disclosure.

Referring now to the drawings, wherein the showings are for the purpose of illustrating certain exemplary embodiments only and not for the purpose of limiting the same, embodiments of an energy-absorbing pad 10 configured to absorb energy associated with a compressive force between first and second impact surfaces 12 and 14 are shown. Like numerals refer to like elements in the various drawings and embodiments. The energy-absorbing pad 10 includes a polymeric material 20 that commingles with a structural element 30 to form a unitary piece that can absorb energy associated with compressive force created by an impact between the first and second impact surfaces 12 and 14. Preferably the polymeric material 20 overfills the structural element 30 when they are commingled.

The polymeric material 20 is a material having a first temperature-responsive stiffness. The first temperature-responsive stiffness is a stiffness of the material, e.g., modulus of elasticity, that is temperature-responsive, i.e., the stiffness of the material changes with a change in material temperature. In one embodiment, the first temperature-responsive stiffness of the polymeric material 20 decreases in response to an increase in the material temperature. In one embodiment, the polymeric material 20 is a crushable foam material. Alternatively, the polymeric material 20 is an active material (AM), e.g., a shape memory polymer (SMP) formulated to have the first temperature-responsive stiffness including a stiffness that decreases in response to an increase in material temperature.

The structural element 30 is a fabricated element constructed from an active material (AM), e.g., a shape memory alloy (SMA). The active material is preferably formulated such that the structural element 30 achieves a second temperature-responsive stiffness that is converse to the first temperature-responsive stiffness associated with the polymeric material 20. This includes formulating the active material to have a transformation temperature range such that the structural element 30 achieves the second temperature-responsive stiffness that is converse to the first temperature-responsive stiffness associated with the polymeric material 20. In one embodiment the second temperature-responsive stiffness of the structural element 30 fabricated from the active material increases in response to an increase in material temperature.

The second temperature-responsive stiffness is said to be converse to the first temperature-responsive stiffness in that the second temperature-responsive stiffness increases in response to an increase in material temperature whereas the first temperature-responsive stiffness decreases in response to an increase in material temperature. Preferably a rate of increasing stiffness associated with the first temperature-responsive stiffness corresponds to a rate of decreasing stiffness associated with the second temperature-responsive stiffness such that the overall stiffness of the energy-absorbing pad 10 including the polymeric material 20 commingled with the structural element 30 is substantially constant over an expected range of material and ambient temperatures. Preferably the predetermined range of material and ambient temperatures correspond to material and ambient temperatures associated with applications of the energy-absorbing pad 10. In one embodiment the first temperature-responsive stiffness associated with the polymeric material 20 decreases with increased material temperature and the second temperature-responsive stiffness associated with the structural element 30 increases with the increased material temperature.

The structural element 30 is fabricated from a shape memory alloy that has a transformation temperature range and an associated temperature-responsive stiffness. In one embodiment the structural configuration of the fabricated structural element 30 in combination with the formulated temperature-responsive stiffness of the shape memory alloy achieves the second temperature-responsive stiffness. Thus an overall stiffness of the energy-absorbing pad 10 is substantially unchanged over the predetermined range of ambient temperatures. The first and second temperature-responsive stiffnesses of the active materials (AM) forming the polymeric material 20 and the structural element 30 of the energy-absorbing pad 10 are preferably passive, i.e., there is no active temperature monitoring and associated control.

The structural element 30 is fabricated using an active material, which preferably includes a shape memory alloy (SMA). As used herein the term active material (AM) includes a material or polymeric composite that undergoes a reversible change in a characteristic property when activated by an external stimulus. As described herein, the external stimulus for the active material includes a change in material temperature. Active materials include shape memory alloys (SMA) and shape memory polymers (SMP), and other materials as appreciated by those skilled in the art. Preferably, the structural element 30 is fabricated using a shape memory alloy (SMA) having martensite and austenite transformation temperature ranges that are substantially coincident with a range of ambient temperatures at which the energy-absorbing pad 10 is used.

A shape memory alloy can exist in several different temperature-dependent phases, including martensite and austenite phases. The martensite phase refers to a more deformable and less stiff phase that occurs at lower material temperatures. The austenite phase refers to a stiffer and more rigid phase that occurs at higher material temperatures. There are transformation temperature ranges including start temperatures and end temperatures over which a shape memory alloy transforms between the martensite and austenite phases. A shape memory alloy in the martensite phase changes into the austenite phase over an austenite transformation temperature range with increasing material temperature. The material temperature at which the change from the martensite phase to the austenite phase begins is referred to as austenite start temperature $T(A_S)$. The material temperature at which the change to the martensite phase is complete is called the austenite finish temperature $T(A_F)$.

A shape memory alloy in the austenite phase changes into the martensite phase over a martensite transformation temperature range with decreasing temperature. The material temperature at which the change from the austenite phase to the martensite phase begins is referred to as martensite start temperature $T(M_S)$. The material temperature at which the change to the austenite phase is complete is called the martensite finish temperature $T(M_F)$. A shape memory alloy has a lower modulus of elasticity and is more easily deformable in the martensite phase and has a higher modulus of elasticity and is thus less easily deformable in the austenite phase.

Active materials that exhibit an intrinsic shape memory effect are fabricated from a shape memory alloy composition that will automatically reform as a result of the above noted phase transformations.

Preferably, the structural element 30 is fabricated using a shape memory alloy (SMA) having martensite and austenite transformation temperature ranges that allow the structural element 30 to achieve the second temperature-responsive stiffness over the range of ambient temperatures at which the energy-absorbing pad 10 is used.

Intrinsic two-way shape memory behavior is preferably induced in the active material through processing. Such procedures include extreme deformation of the material while in the martensite phase, heating-cooling under constraint or load, or surface modification such as laser annealing, polishing, or shot-peening. Once the active material has been trained to exhibit the two-way shape memory effect, the shape change between the low and high temperature states is generally reversible and persists through a high number of thermal cycles. Active materials that exhibit the extrinsic two-way shape memory effects are composite or multi-component materials that combine a shape memory alloy composition that exhibits a one-way effect with another element that provides a restoring force to reform the original shape. The temperature at which the shape memory alloy remembers its high temperature form when heated can be adjusted by slight changes in the composition of the alloy and through heat treatment. In nickel-titanium shape memory alloys, for example, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the active material with shape memory effects as well as energy damping capacity. The energy damping capacity of the shape memory alloys can be used to counteract changes in the energy absorbing properties of the crushable foam material of the polymeric material 20. One skilled in the art is capable of formulating shape memory alloys to have transformation temperature ranges that counteract changes in the energy absorbing properties of the crushable foam material of the polymeric material 20.

Suitable shape memory alloy materials include without limitation nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape, dimension, damping capacity, and the like. Another alloy includes a nickel-titanium based alloy commonly referred to as nitinol.

Figure 1B:
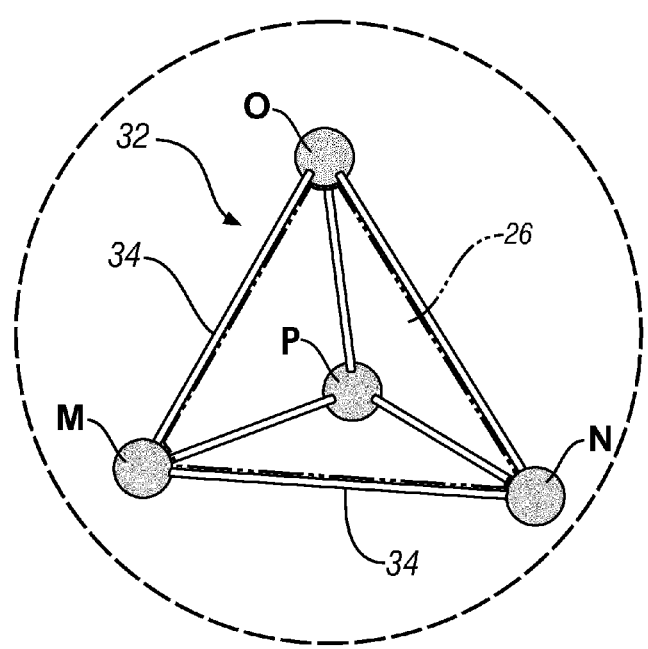

FIGS. 1A and 1B schematically show a first embodiment of the energy-absorbing pad 10A including the polymeric material 20 commingled with an embodiment of the structural element 30A fabricated using shape memory alloy (SMA). FIG. 1A shows a schematic two-dimensional side view of the first embodiment. The pad 10A includes the first impact surface 12 substantially parallel to the second impact surface 14. The structural element 30A structurally reinforces the polymeric material 20 in accordance with the structure and temperature-compensation characteristics described herein. The structural element 30A includes a lattice-like structure that is commingled with the polymeric material 20 by embedding the structural element 30A within the polymeric material 20, or alternatively, coating an open space 26 of the structural element 30A with the polymeric material 20 fabricated using the crushable foam material. The lattice-like structure includes a multiplicity of triangular pyramid forms 32 that are contiguously integrated to form a planar structure. FIG. 1B shows a schematic three-dimensional isometric view of a single one of the triangular pyramid forms 32 including wire elements 34 that are joined or otherwise connected at nodes M, N, O, and P and form the open space 26. The wire elements 34 are formed from the shape memory alloy (SMA) described herein. In one embodiment, flat planar sheets 35 fabricated using the shape memory alloy (SMA) are assembled onto a top and a bottom portion of the planar structure formed by the multiplicity of integrated, contiguous triangular pyramid forms 32. Another layer 40 including a woven or other material can be fixedly attached onto one side, as shown, or alternatively onto both sides of the energy-absorbing pad 10A to provide added features to the pad, e.g., wear, weatherproofing, printing, and fasteners, or self-adhesive materials including hook and loop products. As shown the structural element 30A includes a single layer of the lattice-like structure. Alternatively, the structural element 30A can include multiple layers of the lattice-like structure. The polymeric material 20 can overfill the sheets 35 onto the top and bottom portions of the structural element 30A.

Figure 2A:
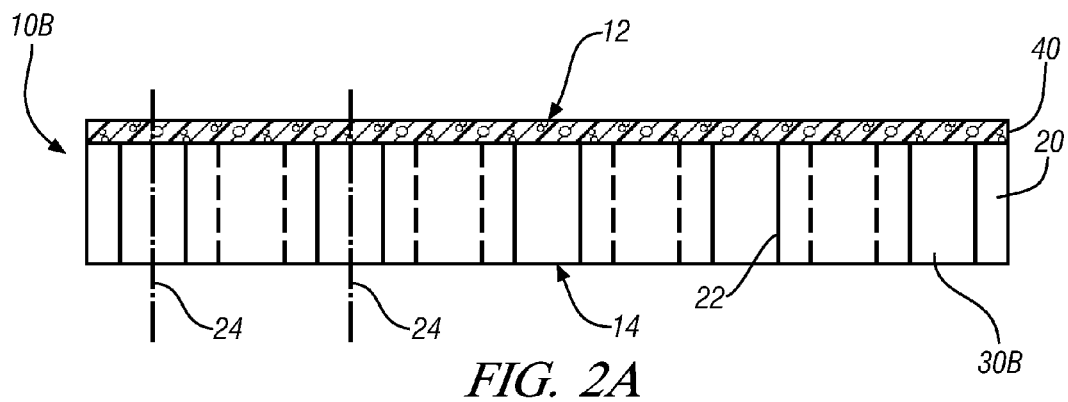
FIGS. 2A and 2B are schematic diagrams of a second embodiment in accordance with the present disclosure.
Figure 2B:
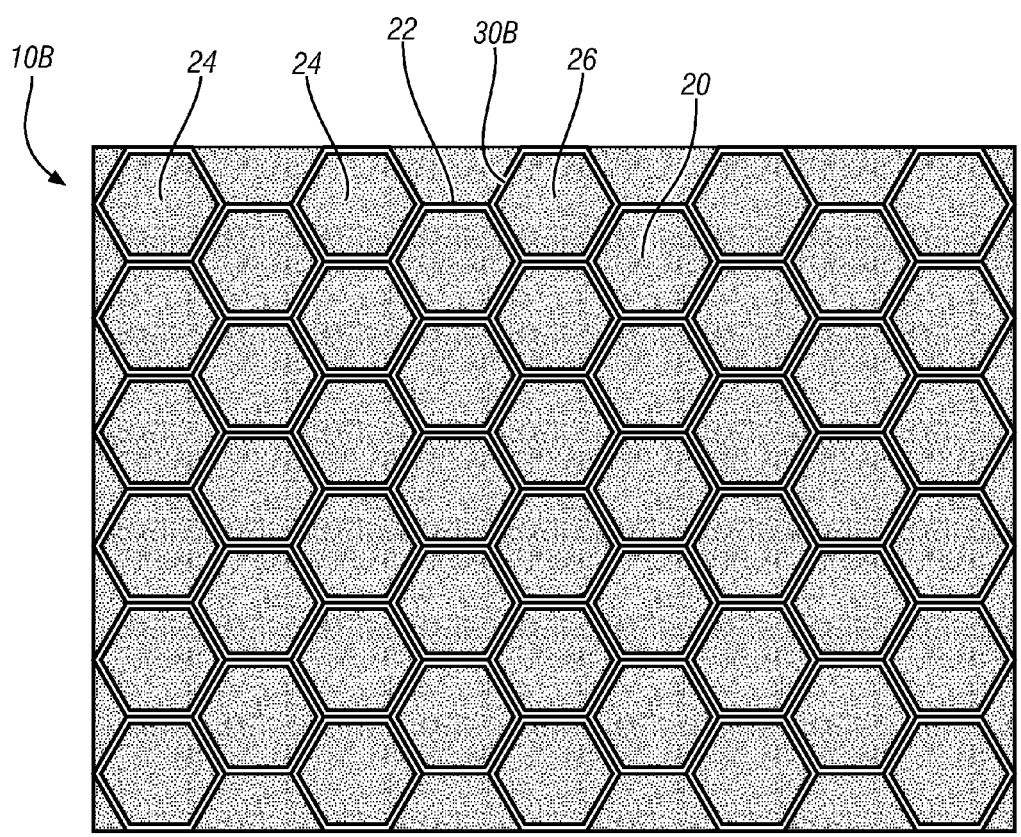

FIGS. 2A and 2B show a schematic two-dimensional top view and side view, respectively, of a second embodiment of the energy-absorbing pad 10B, including the polymeric material 20 commingled with an embodiment of the structural element 30B fabricated using shape memory alloy (SMA). The pad 10B includes the first impact surface 12 substantially parallel to the second impact surface 14. Layer 40 can be assembled onto one side, as shown, or alternatively onto both sides of the energy-absorbing pad 10B. The structural element 30B structurally reinforces the polymeric material 20 in accordance with the structure and temperature-compensation characteristics described herein. In this embodiment, the structural element 30B is fabricated using sheets of the shape memory alloy (SMA) to form a multiplicity of contiguous open tubular-shaped cells 22 having parallel longitudinal axes 24. The contiguous open tubular-shaped cells 22 circumscribe the open spaces 26. When the polymeric material 20 includes the crushable foam material, the crushable foam material is injected in liquid form into the open spaces 26, preferably substantially filling each of the open spaces 26. When the polymeric material 20 includes the shape memory polymer, the shape memory polymer forms a coating on the walls of the contiguous open tubular-shaped cells 22. In one embodiment, the tubular-shaped cells 22 each have a hexagonal cross-section, and the multiplicity of contiguous open tubular-shaped cells 22 form a honeycomb configuration. Alternatively, the tubular-shaped cells 22 can have one of a circular, oval, square, rectangular, and any other suitable cross-sectional shape. The longitudinal axes 24 of the tubular-shaped cells 22 are orthogonal to the first and second impact surfaces 12 and 14 of the energy-absorbing pad 10B in one embodiment. Alternatively, the longitudinal axes 24 of the tubular-shaped cells 22 can be parallel to the first and second impact surfaces 12 and 14 in one embodiment. The polymeric material 20 can overfill the tubular-shaped cells 22 on the top and bottom portions of the structural element 30B.

Figure 3A:
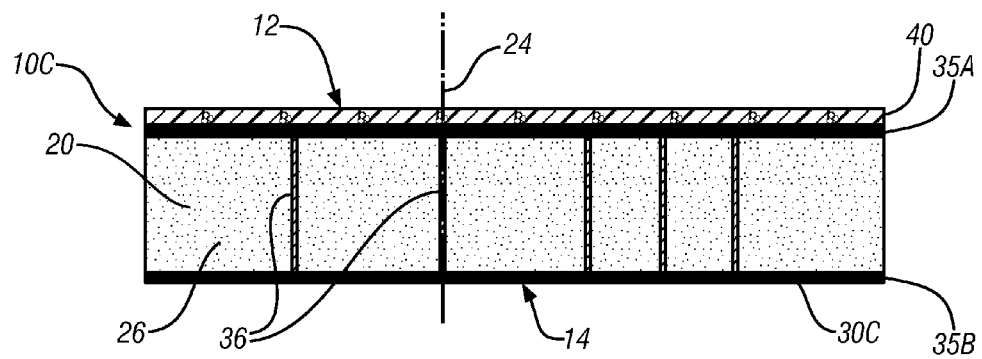
FIGS. 3A and 3B are schematic diagrams of a third embodiment of padding in accordance with the present disclosure.
Figure 3B:
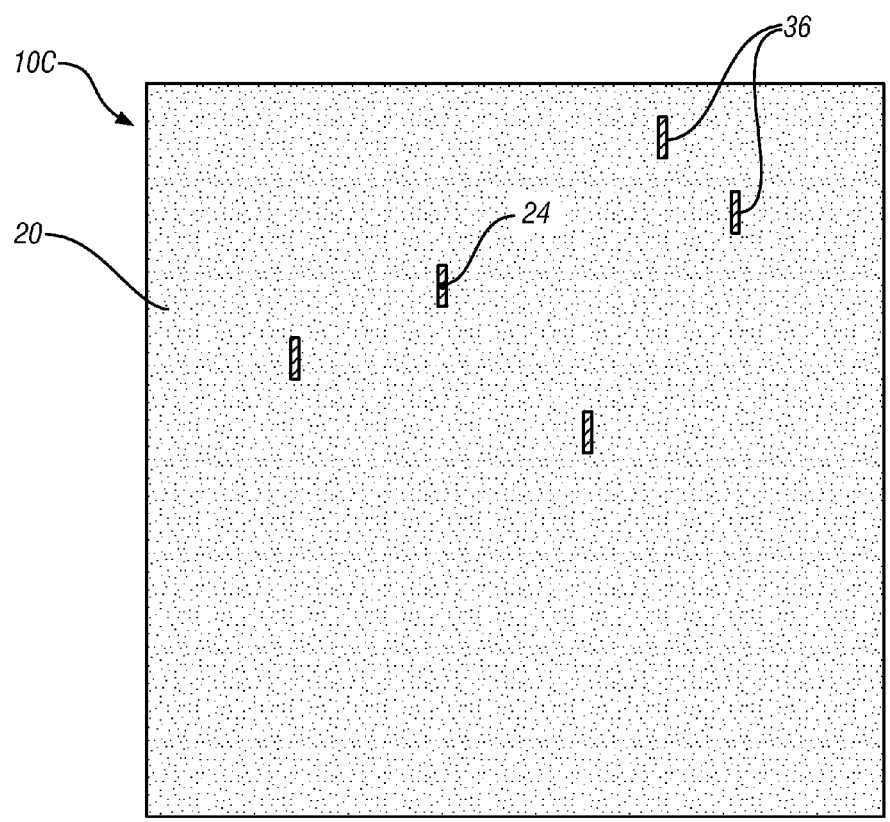

FIGS. 3A and 3B show a schematic two-dimensional top view and side view, respectively, of a third embodiment of the energy-absorbing pad 10C, including the polymeric material 20 commingled with an embodiment of the structural element 30C fabricated using shape memory alloy (SMA). Layer 40 can be assembled onto one side, as shown, or alternatively onto both sides of the energy-absorbing pad 10C. The pad 10C includes the first impact surface 12 substantially parallel to the second impact surface 14. The structural element 30C structurally reinforces the polymeric material 20 in accordance with the structure and temperature-compensation characteristics described herein. In this embodiment, the structural element 30C includes a top and a bottom portion of a planar structure formed by parallel flat sheets 35A and 35B fabricated using the shape memory alloy. The parallel flat sheets 35A and 35B are separated by a multiplicity of parallel individual strips 36 that are fabricated using shape memory alloy and having longitudinal axes 24 that are orthogonal to the parallel flat sheets 35A and 35B. The individual strips 36 are fixedly attached to both of the parallel flat sheets 35A and 35B. The polymeric material 20 including the crushable foam material is preferably injected into the open space 26 between the parallel flat sheets 35A and 35B separated by the parallel individual strips 36 of shape memory alloy. The polymeric material 20 including the crushable foam material can overfill the parallel flat sheets 35A and 35B.

The polymeric material 20 including the shape memory polymer (SMP) has a temperature-responsive behavior that includes a change in material temperature at or near a transformation temperature range to effect a change in shape, dimension, and stiffness. A shape memory polymer may contain more than two transformation temperature ranges associated with different states. For example, a shape memory polymer composition can include a hard state and two or more soft states with three associated transformation temperature ranges. One skilled in the art is capable of formulating shape memory polymers (SMP) to have transformation temperature ranges that achieve the desired results described herein.

Suitable shape memory polymers include thermoplastics, thermosets, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), poly(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). Examples of other suitable polymers include polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)-poly (ethylene terephthalate), polyethylene/nylon (graft copolymer), polycaprolactones-polyamide (block copolymer), poly (caprolactone) dimethacrylate-n-butyl acrylate, poly (norbornyl-polyhedral oligomeric silsequioxane), polyvinylchloride, urethane/butadiene copolymers, polyurethane block copolymers, styrene-butadiene-styrene block copolymers, and the like.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A protective device, comprising:
  an impact-absorbing pad comprising a passive unitary piece having no connection to active temperature monitoring and control, the impact-absorbing pad comprising a shape memory polymer commingled with a structural element between first and second impact surfaces;
  a layer attached to said impact-absorbing pad comprising at least one of an adhesive, a fastener, and a hook and loop product;
  said shape memory polymer having a first temperature-responsive stiffness comprising a rate of decreasing stiffness with respect to rising temperature; and said structural element fabricated from a shape memory alloy such that the structural element has a second temperature-responsive stiffness comprising a rate of increasing stiffness with respect to rising temperature;

wherein said first temperature-responsive stiffness is converse to said second temperature responsive stiffness such that an overall stiffness of said impact-absorbing pad is constant over an expected range of material and ambient temperatures.

2. The protective device of claim 1, wherein the shape memory polymer comprises a crushable foam material having the first temperature-responsive stiffness.

3. The protective device of claim 1, wherein the structural element comprises a plurality of shape memory alloy elements arranged in a lattice structure to form a planar structure.

4. The protective device of claim 3, wherein the lattice structure comprises contiguously integrated triangular pyramid forms.

5. The protective device of claim 1, wherein the structural element comprises a multiplicity of contiguous open tubular-shaped cells having parallel longitudinal axes.

6. The protective device of claim 5, wherein the contiguous open tubular-shaped cells each have a hexagonal cross-section.

7. The protective device of claim 5, wherein the longitudinal axes of the multiplicity of contiguous open tubular-shaped cells are orthogonal to an impact surface of the impact-absorbing pad.

8. The protective device of claim 5, wherein the longitudinal axes of multiplicity of contiguous open tubular-shaped cells are parallel to an impact surface of the impact-absorbing pad.

9. The protective device of claim 5, wherein the shape memory polymer is injected into open spaces formed by the contiguous open tubular-shaped cells.

10. The protective device of claim 1, wherein the structural element comprises a planar structure formed by parallel flat sheets comprising the shape memory alloy and separated by a multiplicity of parallel individual strips having longitudinal axes orthogonal to the parallel flat sheets.

11. The protective device of claim 10, wherein the parallel individual strips comprise the shape memory alloy.

12. A protective device, comprising:
an impact-absorbing pad, comprising:
a shape memory polymer having a first temperature-responsive stiffness including an associated rate of decreasing stiffness with respect to increasing temperature;
a structural element comprising a shape memory alloy formulated to have a transformation temperature range that achieves a second temperature-responsive stiffness of the structural element including an associated rate of increasing stiffness with respect to increasing temperature, wherein said first temperature-responsive stiffness is converse to said second temperature responsive stiffness such that an overall stiffness of said protective device is constant over an expected range of material and ambient temperatures;
a layer attached to said impact-absorbing pad comprising at least one of an adhesive, a fastener, and a hook and loop product;
the shape memory polymer commingled with the structural element; and
wherein the impact-absorbing pad has no connection to active temperature monitoring and control.

13. The protective device of claim 12, wherein the structural element comprises a plurality of shape memory alloy elements arranged in a lattice structure.

14. The protective device of claim 13, wherein the structural element is encased within the shape memory polymer.

15. The protective device of claim 12, wherein the structural element comprises a multiplicity of contiguous open tubular-shaped cells comprising a shape memory alloy and having parallel longitudinal axes.

16. The protective device of claim 12, wherein the structural element comprises a planar structure formed by parallel flat sheets separated by a multiplicity of parallel individual strips comprising a shape memory alloy and having longitudinal axes orthogonal to the parallel flat sheets.

* * * * *